United States Patent
Song (10) Patent No.: US 10,259,400 B1
(45) Date of Patent: Apr. 16, 2019

(54) ONE-TOUCH TYPE SUPPORTING HOLDER (71) Applicant: CPC Co., Ltd., Hwaseong-si, Gyeonggi-do (KR)

(72) Inventor: Soon Young Song, Anyang-si (KR)

(73) Assignee: CPC Co., Ltd., Hwaseong-si, Gyeonggi-do (KR)

( * ) Notice: Subject to any disclaimer, the term of this patent is extended or adjusted under 35 U.S.C. 154(b) by 0 days.

(21) Appl. No.: 16/012,727

(22) Filed: Jun. 19, 2018

(51) Int. Cl.
*F16B 2/12* (2006.01)
*B60R 11/00* (2006.01)
*B60R 11/02* (2006.01)

(52) U.S. Cl.
CPC ...... *B60R 11/0241* (2013.01); *B60R 11/0235* (2013.01); *B60R 11/0258* (2013.01); *F16B 2/12* (2013.01); *B60R 2011/0071* (2013.01)

(58) Field of Classification Search
CPC .......... B60R 11/0241; B60R 11/0235; B60R 11/0258; B60R 2011/0071; F16B 2/12
See application file for complete search history.

(56) References Cited

U.S. PATENT DOCUMENTS

| | | | |
|---|---|---|---|
| 2014/0263931 A1* | 9/2014 | Chen | F16M 11/041 248/576 |
| 2018/0252358 A1* | 9/2018 | Yang | F16M 13/022 |

* cited by examiner

*Primary Examiner* — Anita M King
(74) *Attorney, Agent, or Firm* — Revolution IP, PLLC (57) ABSTRACT

An one-touch type supporting holder includes: a holder body which includes a first main body supported on a base, and a second main body stacked and coupled to the first main body; a clamping section which includes a first clamping section coupled to the first main body, and a second clamping section coupled to the first clamping section; a clamping elastic section which elastically supports the second clamping section with respect to the first clamping section; an one-touch elastic section which elastically supports the second main body with respect to the first main body; and an one-touch guide section which comprises a first guide section to control forward and backward reciprocating movement states of the second main body in the first main body, and a second guide section to control forward and backward reciprocating movement states of the second main body in the first main body.

6 Claims, 11 Drawing Sheets

ONE-TOUCH TYPE SUPPORTING HOLDER

BACKGROUND OF THE INVENTION

(a) Field of the Invention

The present disclosure relates to a one-touch type supporting holder, and more particularly to a one-touch type supporting holder which not only achieves a preparatory state for gripping an electronic device but is also convenient for mounting the electronic device to the supporting holder by one touch.

(b) Description of the Related Art

In general, with recent development of mobile phone technology, a mobile phone where various functions for a moving picture, Internet search, a global positioning system (GPS), etc. are fused, i.e. a smart phone has been widely used. To use such as mart phone for the moving picture function, the Internet search function, the GPS function or the like, the smart phone has to be stationarily installed with its screen facing toward a user. However, a conventional smart phone and a conventional smart phone case have a limited function of stationarily installing the smart phone.

Further, a supporting holder for supporting the smart phone in a vehicle as a structure of employing a magnet to only hold a battery at the back of the smart phone without clamping the smart phone. Therefore, there arises a problem that the smart phone is likely to separate or move from the supporting holder by a shock generated when the vehicle is driven along a winding road having a bump and the like. Besides, a magnetic field around the magnet may cause problems in a hands-free call of the smart phone.

SUMMARY OF THE INVENTION

Accordingly, the present disclosure is conceived to solve the foregoing problems, and an aspect of the present disclosure is to provide a one-touch type supporting holder which not only achieves a preparatory state for gripping an electronic device but is also convenient for mounting the electronic device to the supporting holder by one touch.

In accordance with an embodiment of the present disclosure, there is provided a one-touch type supporting holder including: a holder body which includes a first main body supported on a base, and a second main body stacked and coupled to the first main body and capable of reciprocating in forward and backward directions; a clamping section which includes a first clamping section coupled to the first main body and capable of reciprocating in left and right directions or up and down directions, and a second clamping section coupled to the first clamping section and capable of reciprocating in left and right directions or up and down directions so as to reciprocate in parallel with the first clamping section; a clamping elastic section which elastically supports the second clamping section with respect to the first clamping section; a one-touch elastic section which elastically supports the second main body with respect to the first main body; and a one-touch guide section which includes a first guide section to control forward and backward reciprocating movement states of the second main body in the first main body corresponding to reciprocating movement of the first clamping section, and a second guide section to control forward and backward reciprocating movement states of the second main body in the first main body corresponding to reciprocating movement of the second clamping section.

Here, the first clamping section may include a first clamp slider coupled to the first main body by a first reciprocation section and capable of reciprocating; a first clamp wing protruding from the first clamp slider at one side intersecting the reciprocating direction frontward at one side of the second main body; and a first operation guide provided at one side of the first clamp slider in parallel with the reciprocating direction and protruding toward the other side of the second main body.

Here, the second clamping section may include a second clamp slider coupled to the first clamping section by a second reciprocation section and capable of reciprocating; a second clamp wing protruding from the second clamp slider at one side intersecting the reciprocating direction frontward at the other side of the second main body; and a second operation guide provided at one side of the second clamp slider in parallel with the reciprocating direction and protruding toward one side of the second main body.

The clamping elastic section may include a guide groove lengthwise recessed or formed by penetration in parallel with a reciprocating direction of the clamping section, in at least one of the first clamping section and the second clamping section with respect to a surface where the first clamping section and the second clamping section face with each other; a first support protrusion protruding from the first clamping section in relation to the guide groove; a second support protrusion protruding from the second clamping section in relation to the guide groove; and a clamping elastic member having a first end supported by the first support protrusion and a second end supported by the second support protrusion as inserted in the guide groove.

The one-touch elastic section may include a one-touch mounting groove protruding from one of the first main body and the second main body, a one-touch projection protruding from the other one of the first main body and the second main body and being opposite to the one-touch mounting groove, and a one-touch elastic member having a first end supported by the one-touch mounting groove and a second end supported by the one-touch projection and elastically supporting the second main body against the first main body.

Here, the second main body may include a one-touch wing formed at an edge thereof in parallel with the reciprocating direction of the clamping section and protruding toward the first main body. In this case, the first guide section may include a first guide protrusion protruding from the first clamping section toward the one-touch wing; and a first guide groove provided in the one-touch wing, forming the reciprocating path of the first guide protrusion corresponding to the reciprocating movement of the first clamping section as the first guide protrusion is inserted therein, and forming the reciprocating path of the first guide protrusion corresponding to the reciprocating movement of the second main body. The second guide section may include a second guide protrusion protruding from the second clamping section toward the one-touch wing, and a second guide groove provided in the one-touch wing, forming the reciprocating path of the second guide protrusion corresponding to the reciprocating movement of the second clamping section as the second guide protrusion is inserted therein, and forming the reciprocating path of the second guide protrusion corresponding to the reciprocating movement of the second main body.

BRIEF DESCRIPTION OF THE DRAWINGS

The above and/or other aspects of the present disclosure will become apparent and more readily appreciated from the following description of the exemplary embodiments, taken in conjunction with the accompanying drawings, in which.

DETAILED DESCRIPTION

Below, embodiments of a one-touch type supporting holder according to the present disclosure with reference to the accompanying drawings. In this case, the present disclosure is not limited or restricted to the embodiments. Further, details of publicly known functions or elements may be omitted in describing the present disclosure to make the gist of the present disclosure clear.

Referring to FIGS. 1 to 13, a one-touch type supporting holder according to one embodiment of the present disclosure may include a holder body 10, a clamping section 20, a clamping elastic section 30, a one-touch elastic section 40, and a one-touch guide section 60.

According to one embodiment of the present disclosure, directions will be represented with respect to the shape of the one-touch type supporting holder. For example, the electronic device is mounted in a front direction of the holder body 10, the clamping section 20 reciprocates in left and right directions of the holder body 10, and a second main body 12 in the holder body 10 reciprocates in forward and backward directions with respect to a first main body 11.

The holder body 10 includes the first main body 11 supported on a base B, and the second main body 12 stacked on and coupled to the first main body 11 and reciprocating in the forward and backward directions with respect to the first main body 11. The holder body 10 may further include a third main body 13 stacked and coupled in a front direction of the second main body 12.

The first main body 11 is shaped like a plate so that the clamping section 20 can be stacked thereon and reciprocate. The second main body 12 is stacked on the clamping section 20. The second main body 12 includes a one-touch wing 121 formed at an edge thereof in parallel with the reciprocating direction of the clamping section 20 and protruding toward the first main body 11. The one-touch wings 121 protrude from the edges of the second main body 12 toward the first main body 11 and form a pair to face with each other.

The one-touch wing 121 may have a one-touch locking portion 122 to be locked and supported to the first main body 11 when the second main body 12 becomes distant from the first main body 11 as the clamping section 20 reciprocates. The one-touch wing 121 and the one-touch locking portion 122 are configured to not only guide the second main body 12 to reciprocate in the first main body 11 but also prevent the second main body 12 from separating from the first main body 11.

The third main body 13 may be formed with a cover 131 protruding corresponding to the one-touch wing 121 and parallel with the one-touch wing 121. The cover 131 may protrude from the edge of the third main body 13 and cover the second main body 12.

Corresponding to the one-touch wing 121, the covers 131 may protrude from the edges of the third main body 13 and form a pair to face with each other. The cover 131 may be formed with an exposure hole 132. The exposure hole 132 is formed by penetrating the cover 131 and makes a power connector 83 of a wireless charging section 80 (to be described later) be exposed. Further, the cover 131 may have a connection hole 135 which is recessed or formed by penetration, and through which an electric wire for electric connection of the wireless charging section 80 and a ventilation section 90 passes.

The third main body 13 may include a support pad 133 on the front thereof to prevent the mounted electronic device from slipping. Further, the third main body 13 may include a ventilation guide 134 on the front thereof, which communicates with the ventilation section 90 and forms an air flowing path. Thus, air flows between the electronic device and the third main body 13, thereby cooling the electronic device as well as the wireless charging section 80.

The clamping section 20 clamps the electronic device mounted onto the holder body 10. The clamping section 20 may include a first clamping section 21 coupled to the first main body 11 and reciprocating in left and right directions or up and down directions, and a second clamping section 22 coupled to the first clamping section 21 and reciprocating in parallel with the first clamping section 21 in the left and right directions or the up and down directions.

The first clamping section 21 may include a first clamp slider 211 coupled to the first main body 11 by the medium of a first reciprocation section 51 and capable of reciprocating; a first clamp wing 212 protruding from the first clamp slider 211 at one side intersecting the reciprocating direction frontward at one side of the second main body 12; and a first operation guide 214 provided at one side of the first clamp slider 211 in parallel with the reciprocating direction and protruding toward the other side of the second main body 12.

The first clamp slider 211 may include a support guide 211a protruding therefrom and supporting a second clamp slider 221 of the second clamping section 22. The first clamp wing 212 may include a first support cushion 213 elastically supporting the lateral side of the electronic device. The first clamping section 21 further includes a first knob 215 provided at an end portion of the first operation guide 214 and used for a grip of a user.

Here, the first reciprocation section 51 may include a first reciprocation-path portion 512 provided in one of the first main body 11 and the first clamp slider 211 and forming a reciprocating path for the first clamp slider 211; and a first reciprocation guide 511 provided in the other one of the first main body 11 and the first clamp slider 211 and fitted to the first reciprocation-path portion 512 so as to make reciprocating movement possible.

The second clamping section 22 may include the second clamp slider 221 coupled to the first clamping section 21 by the medium of a second reciprocation section 52 and capable of reciprocating; a second clamp wing 222 protruding from the second clamp slider 221 at one side intersecting the reciprocating direction frontward at the other side of the second main body 12; and a second operation guide 224 provided at one side of the second clamp slider 221 in parallel with the reciprocating direction and protruding toward one side of the second main body 12.

The second clamp wing 222 may include a second support cushion 223 elastically supporting the lateral side of the electronic device. The second clamping section 22 further includes a second knob 225 provided at an end portion of the second operation guide 224 and used for a grip of a user.

The second reciprocation section 52 may include a second reciprocation-path portion 522 recessed in each of the first clamping section 21 and the second clamping section 22 so that the one-touch elastic section 40 can be fitted thereto, and a second reciprocation guide 521 protruding from at least one of the first clamping section 21 and the second clamping section 22 and fitted to the second reciprocation-path portion 522 so as to make reciprocating movement possible. Here, the one-touch elastic section 40 is inserted in the second reciprocation-path portion 522 so that reciprocating movement can be possible, thereby preventing the one-touch elastic section 40 from being interfered with the reciprocating movement of the clamping section 20.

The clamping elastic section 30 elastically supports the second clamping section 22 with respect to the first clamping section 21. Two or more clamping elastic sections 30 may be provided along a direction in parallel with the reciprocating direction of the clamping section 20 and facilitate an elastic operation between the first clamping section 21 and the second clamping section 22. A pair of clamping elastic sections 30 may be arranged to be spaced apart from the one-touch elastic section 40.

The clamping elastic section 30 may include a guide groove recessed or formed by penetration lengthwise in parallel with the reciprocating direction of the clamping section 20, in at least one of the first clamping section 21 and the second clamping section 22 with respect to a surface where the first clamping section 21 and the second clamping section 22 face with each other; a first support protrusion 33 protruding from the first clamping section 21 in relation to the guide groove; a second support protrusion 34 protruding from the second clamping section 22 in relation to the guide groove; and a clamping elastic member 35 having a first end supported by the first support protrusion 33 and a second end supported by the second support protrusion 34 as inserted in the guide groove.

The guide groove may include at least one of a first guide groove 31 lengthwise recessed or formed by penetration in the first clamping section 21 with respect to the surface where the first clamping section 21 and the second clamping section 22 face with each other, and a second guide groove 32 lengthwise recessed or formed by penetration in the second clamping section 22 with respect to the surface where the first clamping section 21 and the second clamping section 22 so as to be opposite to the first guide groove 31. When the guide groove includes both the first guide groove 31 and the second guide groove 32, the first support protrusion 33 may protrude from the first guide groove 31, and the second support protrusion 34 may protrude from the second guide groove 32. In relation to the reciprocating movement of the clamping section 20, the first support protrusion 33 and the second support protrusion 34 are inserted in the guide groove, and it is thus possible to prevent the first support protrusion 33 and the second support protrusion 34 from being interfered with the reciprocating movement of the clamping section 20.

The one-touch elastic section 40 elastically supports the second main body 12 against the first main body 11. The one-touch elastic section 40 is provided at a center portion of the first main body 11, thereby preventing the reciprocating movement of the first clamping section 21 and the second clamping section 22 from eccentricity, and making the reciprocating movement of the first clamping section 21 and the second clamping section 22 smooth.

The one-touch elastic section 40 may include a one-touch mounting groove 41 protruding from one of the first main body 11 and the second main body 12, a one-touch projection 42 protruding from the other one of the first main body 11 and the second main body 12 and being opposite to the one-touch mounting groove 41, and a one-touch elastic member 43 having a first end supported by the one-touch mounting groove 41 and a second end supported by the one-touch projection 42 and elastically supporting the second main body 12 against the first main body 11.

The one-touch mounting groove 41 forms a groove in which the one-touch elastic member 43 is inserted. Therefore, the one-touch elastic member 43 is partially inserted in the one-touch mounting groove 41, and the one-touch projection 42 is inserted in the one-touch elastic member 43. In this case, the one-touch projection 42 is not interfered with the one-touch mounting groove 41 since the one-touch projection 42 is inserted in the groove of the one-touch mounting groove 41 while the second main body 12 is close to the first main body 11. The one-touch elastic member 43 may be materialized by a coil spring.

The one-touch guide section 60 controls a reciprocating state of the second main body 12 in the first main body 11 in accordance with the reciprocating movement of the clamping section 20 and the reciprocating movement of the second main body 12 with regard to the first main body 11.

The one-touch guide section 60 may include a first guide section 61 for controlling forward and backward reciprocating movement states of the second main body 12 in the first main body 11 corresponding to the reciprocating movement of the first clamping section 21, and a second guide section 62 for controlling forward and backward reciprocating movement states of the second main body 12 in the first main body 11 corresponding to the reciprocating movement of the second clamping section 22. The first guide section 61 and the second guide section 62 may be respectively provided in the pair of one-touch wings 121 or may be provided in one of the pair of one-touch wings 121.

The first guide section 61 may include a first guide protrusion 611 protruding from the first clamping section 21 toward the one-touch wing 121, and a first guide groove 612 forming a reciprocating path of the first guide protrusion 611 corresponding to the reciprocating movement of the second main body 12 in the first main body 11 and the reciprocating movement of the clamping section 20. In other words, the first guide groove 612 may be provided in the one-touch wing 121, thereby forming the reciprocating path of the first guide protrusion 611 corresponding to the reciprocating movement of the first clamping section 21 as the first guide protrusion 611 is inserted therein, and forming the reciprocating path of the first guide protrusion 611 corresponding to the reciprocating movement of the second main body 12.

The first guide groove 612 may include a first reciprocation groove 613 forming the reciprocating path of the first guide protrusion 611 corresponding to leftward and rightward reciprocating movement of the first clamping section 21, and a first locking groove 614 extended from a first end of the first reciprocation groove 613 and forming the reciprocating path of the first guide protrusion 611 corresponding to the reciprocating movement of the second main body 12. Since the one-touch wing 121 is extended from the second main body 12 in forward and backward directions with respect to the front of the second main body 12, the first reciprocation groove 613 is formed in left and right directions or up and down directions with respect to the reciprocating movement of the first clamping section 21, and the first locking groove 614 is formed in forward and backward directions corresponding to the reciprocating movement of the second main body 12 to thereby stabilize the reciprocating movement of the first guide protrusion 611 while restricting the reciprocating movement of the first guide protrusion 611, and restrict forward and backward reciprocating movement of the second main body 12 with respect to the first main body 11.

The second guide section 62 may include a second guide protrusion 621 protruding from the second clamping section 22 toward the one-touch wing 121, and a second guide groove 622 forming the reciprocating path of the second guide protrusion 621 corresponding to the reciprocating movement of the second main body 12 in the first main body 11 and the reciprocating movement of the clamping section 20. In other words, the second guide groove 622 may be provided in the one-touch wing 121, thereby forming the reciprocating path of the second guide protrusion 621 corresponding to the reciprocating movement of the second clamping section 22 as the second guide protrusion 621 is inserted therein, and forming the reciprocating path of the second guide protrusion corresponding to the reciprocating movement of the second main body 12.

The second guide groove 622 may include a second reciprocation groove 623 forming the reciprocating path of the second guide protrusion 621 corresponding to the reciprocating movement of the second clamping section 22, and a second locking groove 624 extended from a first end of the second reciprocation groove 623 and forming the reciprocating path of the second guide protrusion 621 corresponding to the reciprocating movement of the second main body 12. Since the one-touch wing 121 is extended from the second main body 12 in the forward and backward directions with respect to the front of the second main body 12, the second reciprocation groove 623 is formed in left and right directions or up and down directions with respect to the reciprocating movement of the second clamping section 22, and the second locking groove 624 is formed in the forward and backward directions corresponding to the reciprocating movement of the second main body 12 to thereby stabilize the reciprocating movement of the second guide protrusion 621 while restricting the reciprocating movement of the second guide protrusion 621, and restrict forward and backward reciprocating movement of the second main body 12 with respect to the first main body 11.

The one-touch type supporting holder according to the present disclosure may further include a reciprocation restriction section 53 for coupling at least one of the first clamping section 21 and the second clamping section 22 to the first main body 11 so as to make the reciprocating movement possible.

The reciprocation restriction section 53 may include a restriction groove 531 lengthwise formed by penetration in at least one of the first clamping section 21 and the second clamping section 22 along the reciprocating direction of the clamping section 20 so as to form the restricted reciprocating paths of the first clamping section 21 and the second clamping section 22; a restriction guide groove 532 communicating with the restriction groove 531 and recessed in at least one of the first clamping section 21 and the second clamping section 22 so as to have a larger width than the restriction groove 531; a restriction protrusion 533 protruding from the first main body 11 and capable of reciprocating in the restriction groove 53; and a restriction guide protrusion 534 having a larger width than the restriction groove 531 and coupled to the restriction protrusion 533 so as to reciprocate in the restriction guide groove 532.

The reciprocation restriction section 53 is provided in each of the front and back of the clamping section 20 along the reciprocating direction with respect to the one-touch elastic section 40, thereby coupling the first clamping section 21 and the second clamping section 22 to the first main body 11 so as to make the reciprocating movement possible. In this case, a one-touch support protrusion 71 of a one-touch support section 70 (to be described later) passes through the restriction groove 531. Therefore, the reciprocation restriction section 53 may include an interference preventing hole 535 via which the second reciprocation-path portion 522 and the restriction groove 531 communicate with each other to form a moving path of the one-touch support protrusion 71.

Since the one-touch support protrusion 71 and the restriction protrusion 533 are inserted in the restriction groove 531 as spaced apart from each other, the reciprocating movement of the clamping section 20 is blocked. However, additional configuration of the interference preventing hole 535 makes the restriction protrusion 533 smoothly reciprocate in the restriction groove 531 corresponding to the reciprocating movement of the clamping section 20, allows the one-touch support protrusion 71 to freely move in the reciprocation groove and the restriction groove 531 through an interference preventing hole 535, and prevents the one-touch support protrusion 71 from being interfered with the reciprocating movement of the clamping section 20.

Further, the reciprocation restriction section 53 is provided in a portion where the first operation guide 214 and the second operation guide 224 are stacked, and therefore the first clamping section 21 and the second clamping section 22 are coupled to the first main body 11 so as to make the reciprocating movement possible. In this case, the first operation guide 214 is formed with only the restriction groove 531, and the second operation guide 224 is formed with both the restriction groove 531 and the restriction guide groove 532, thereby maintaining the stacked state of the first clamping section 21 and the second clamping section 22, making the first operation guide 214 and the second operation guide 224 smoothly reciprocate, and preventing the first clamp slider 211 and the second clamp slider 221 from eccentricity.

The one-touch type supporting holder according to one embodiment of the present disclosure may further include the one-touch support section 70 which is spaced apart from the one-touch elastic section 40 and detachably couples the first main body 11 and the second main body 12.

The one-touch support sections 70 are configured to form a pair being spaced apart from each other along the reciprocating direction of the clamping section 20. One pair of one-touch support sections 70 is symmetrically provided with respect to the one-touch elastic section 40 and stabilizes the forward and backward reciprocating movement of the second main body 12. The one-touch support sections 70 forming one pair may be respectively provided in front and back of the one-touch elastic section 40 in the reciprocating direction of the clamping section 20.

The one-touch support section 70 may include the one-touch support protrusion 71 protruding from the second main body 12 toward the first main body 11; a locking hook 72 provided at an end portion of the one-touch support protrusion 71 so as to be hooked to the first main body 11; and a one-touch support hole 73 formed by penetrating the first main body 11 and allowing the one-touch support protrusion 71 and the locking hook 72 to pass there through. Thus, when the second main body 12 becomes away from the first main body 11 along the reciprocating movement of the clamping section 20, the end portion of the locking hook 72 is hooked to and supported on the first main body 11, thereby preventing the second main body from separating from the first main body 11.

The one-touch support protrusion 71 is resilient, and it is thus possible to prevent the one-touch support protrusion 71 from damage even though the second main body 12 tilts while the second main body 12 reciprocates with regard to the first main body 11 and actively cope with the movement of the second main body 12.

The locking hooks 72 are extended from the one-touch support protrusion 71 as one pair having elasticity and spaced apart from each other, and the end portions thereof protrude outward, thereby not only easily passing through the one-touch support hole 73 but also stabilizing the hooking support onto the first main body 11 when the second main body 12 becomes away from the first main body 11.

The inner diameter of the one-touch support hole 73 is substantially equal to the cross-section diameter of the one-touch support protrusion 71 or the locking hook 72, thereby preventing the one-touch support protrusion 71 and the locking hook 72 from separating from the one-touch support hole 73, and facilitating the reciprocating movement of the one-touch support protrusion 71 and the locking hook 72 in the one-touch support hole 73.

The one-touch type supporting holder according to one embodiment of the present disclosure may further include the wireless charging section 80 stationarily stacked between the second main body 12 and the third main body 13 to charge the electronic device to be clamped by the clamping section 20.

Figure 1:
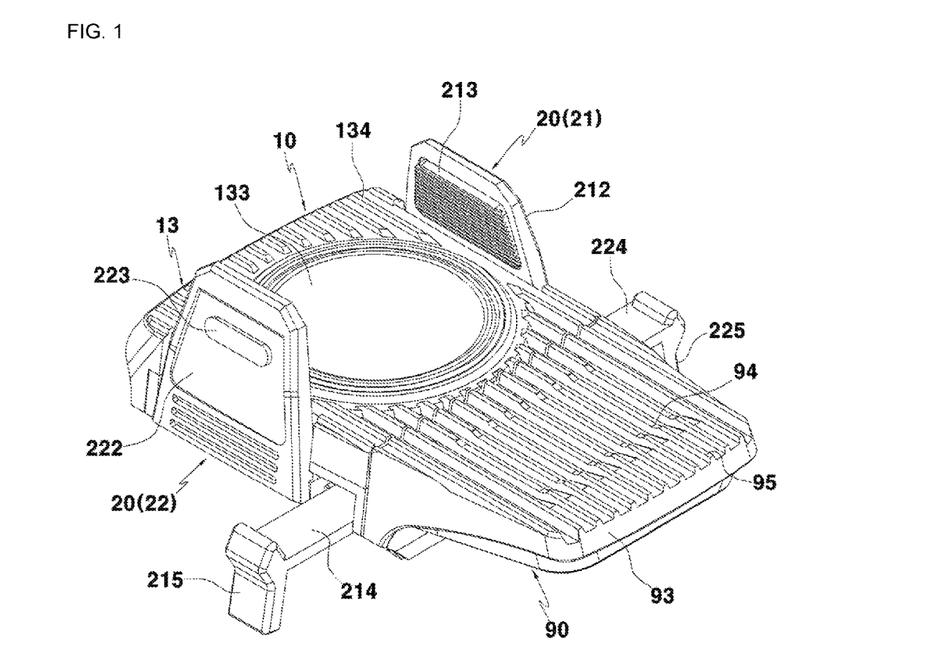
FIG. 1 shows a perspective view of the one-touch type supporting holder according to one embodiment of the present disclosure.
Figure 2:
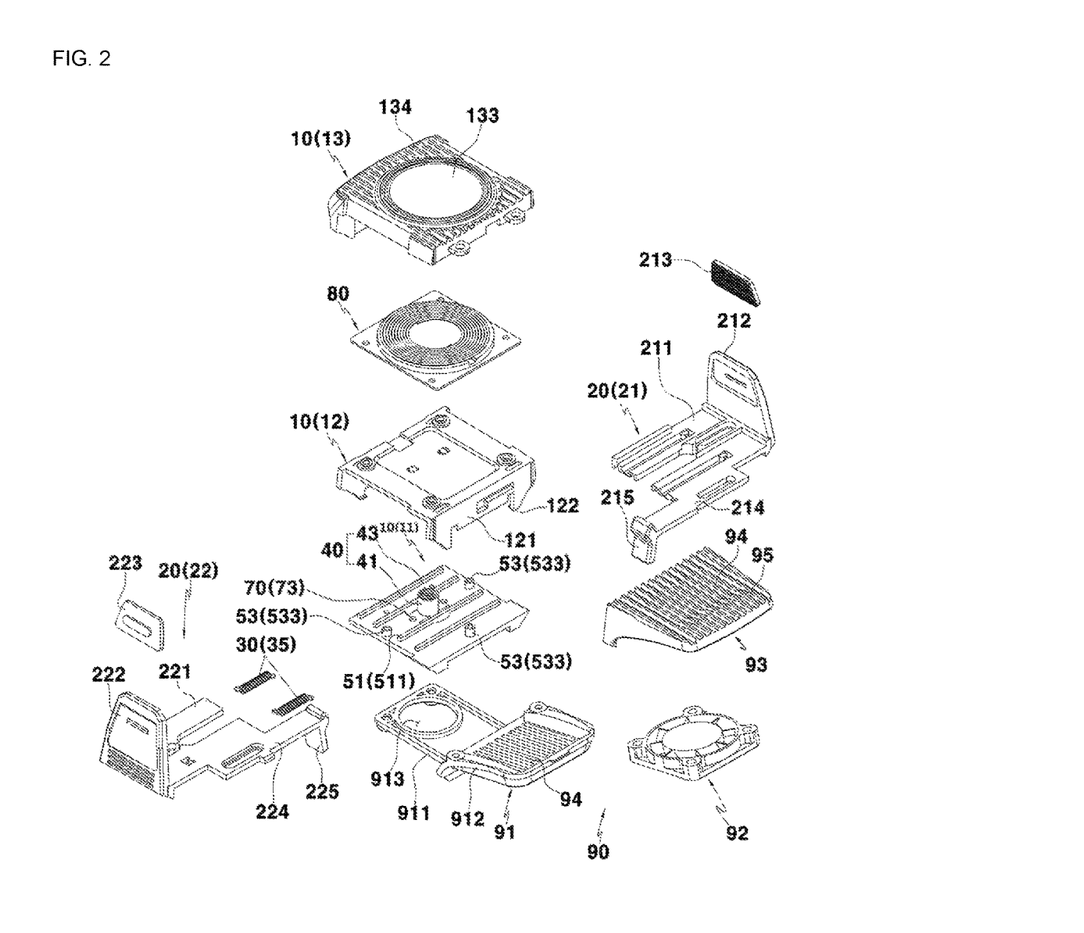
FIG. 2 is an exploded perspective view.
Figure 3:
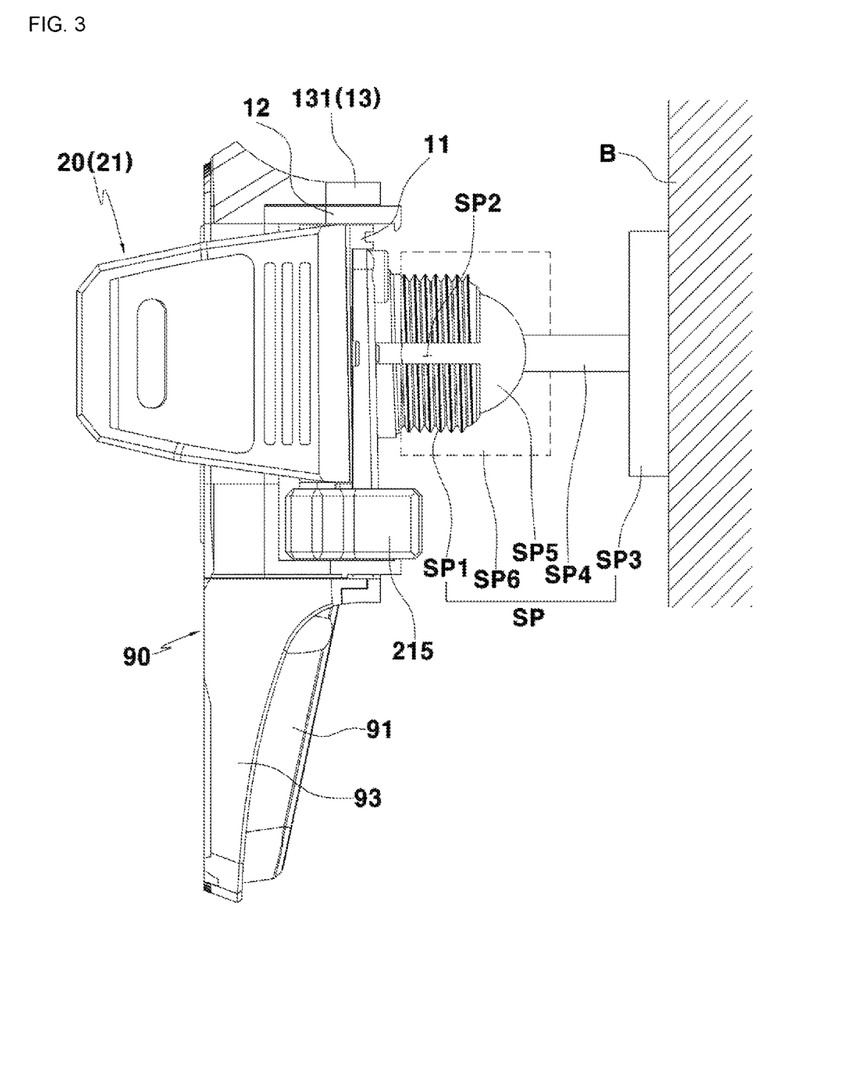
FIG. 3 shows a lateral view of an installed state.
Figure 4:
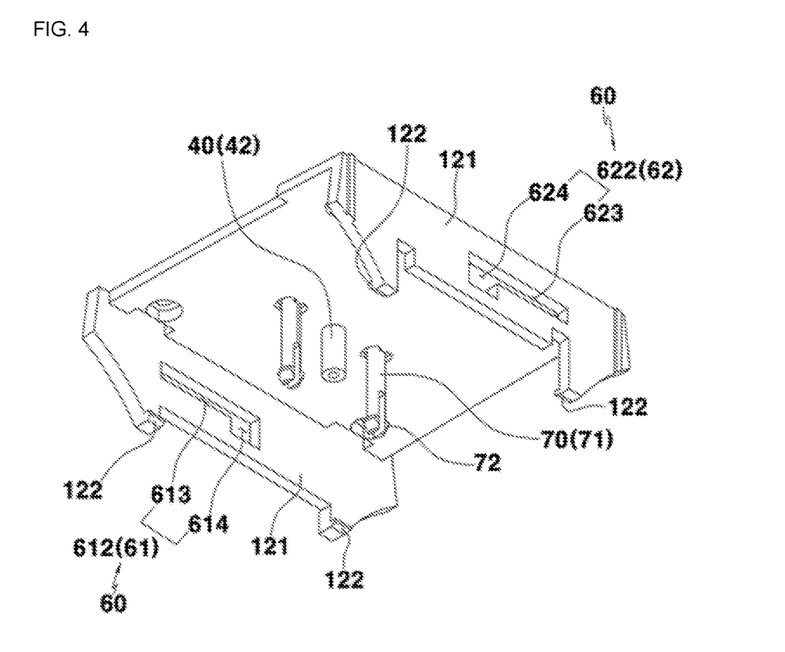
FIG. 4 shows a bottom perspective view of illustrating a second main body in a one-touch type supporting holder according to one embodiment of the present disclosure.
Figure 5:
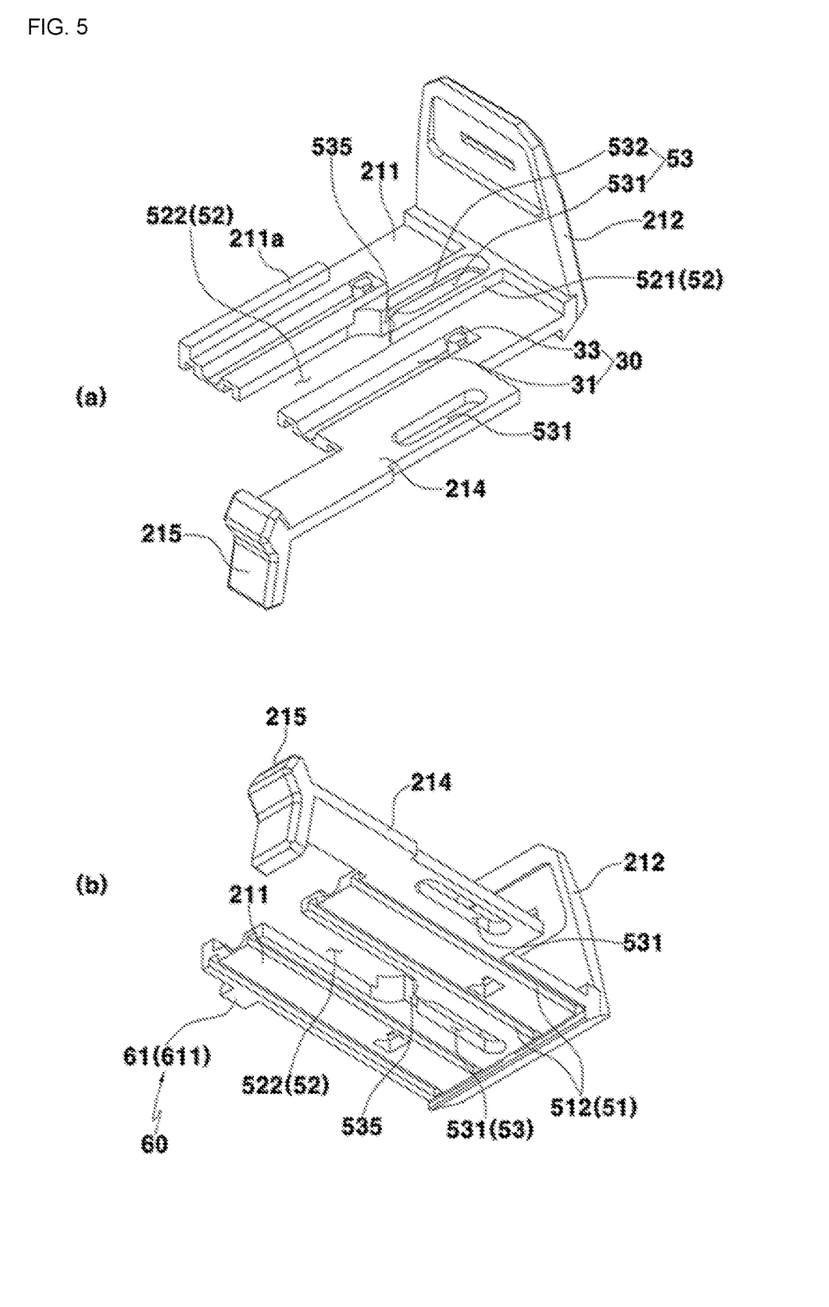
FIG. 5 shows a perspective view and a bottom perspective view of illustrating a first clamping section of a clamping section.
Figure 6:
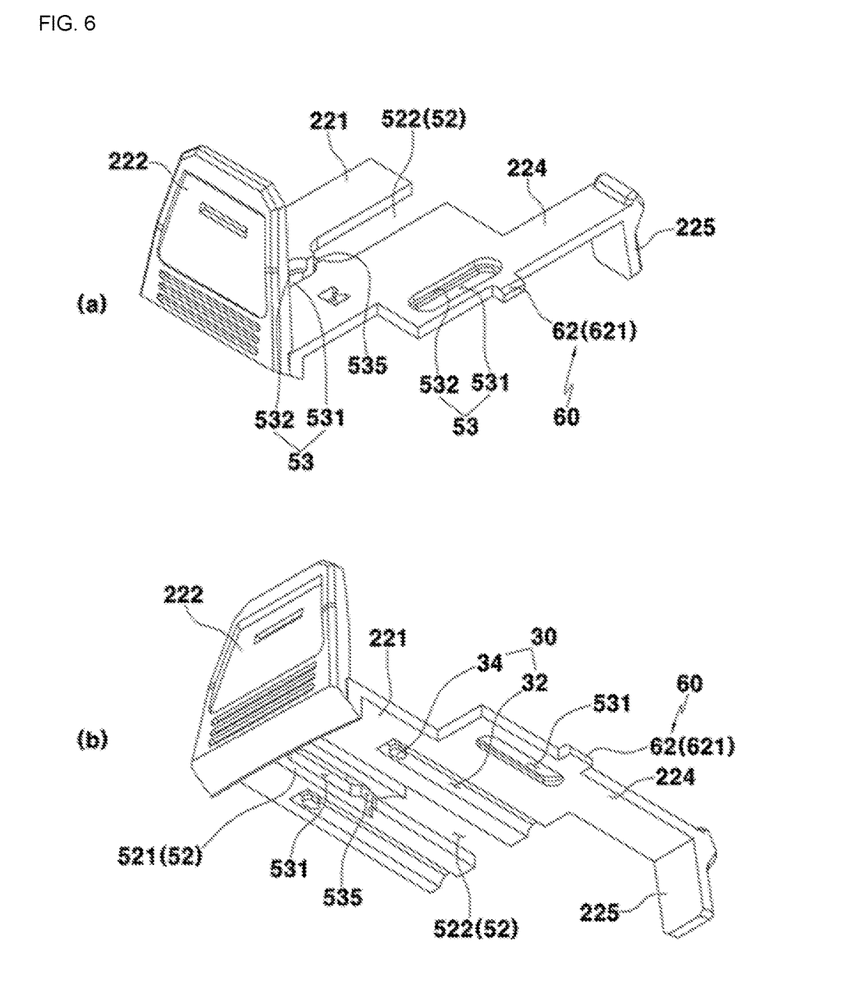
FIG. 6 shows a perspective view and a bottom perspective view of a second clamping section of the clamping section.
Figure 7:
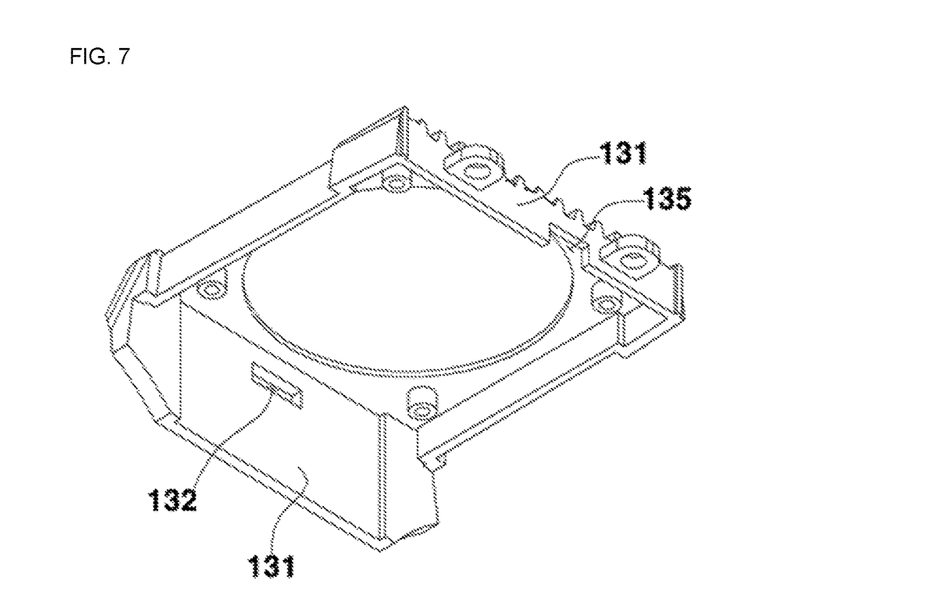
FIG. 7 shows a bottom perspective view of illustrating a third main body.
Figure 8:
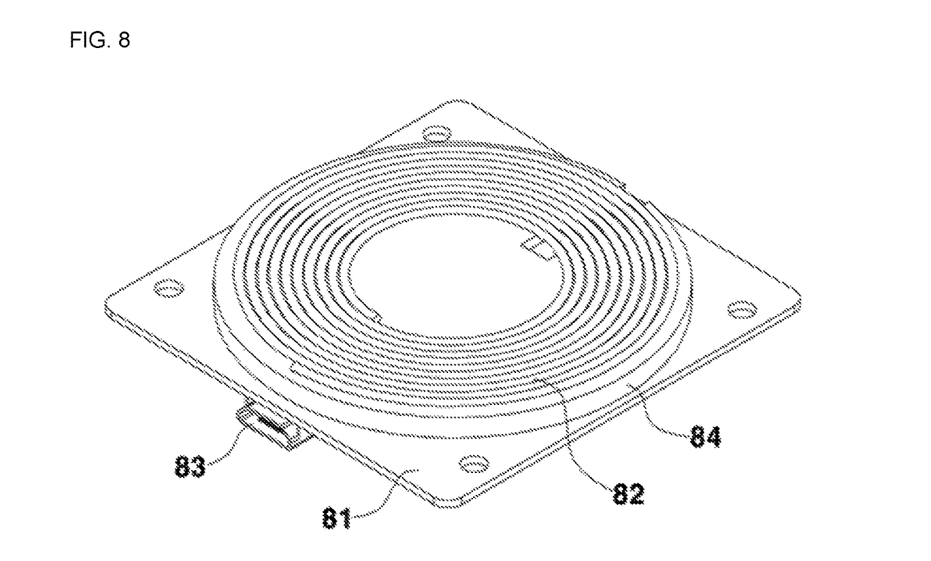
FIG. 8 shows a perspective view of illustrating a wireless charging section.
Figure 9:
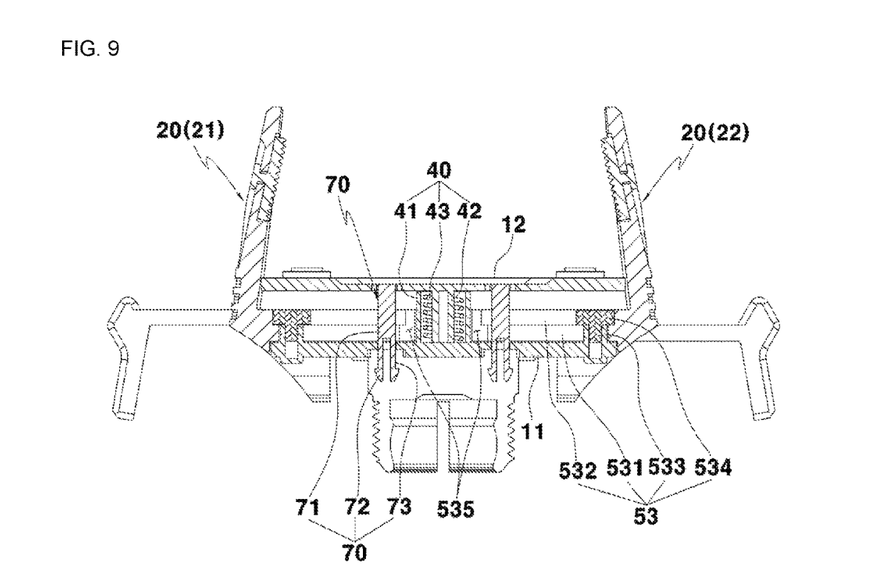
FIG. 9 shows a cross-sectional view of illustrating a sequentially stacked state of a first main body, the first clamping section, the second clamping section and the second main body.
Figure 10:
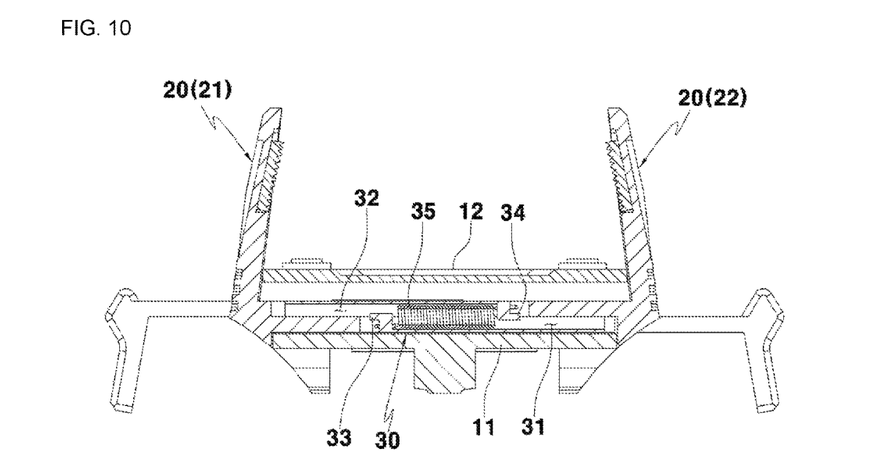
FIG. 10 shows a cross-sectional view of illustrating an arranged state of a clamping elastic section between the first clamping section and the second clamping section.
Figure 11:
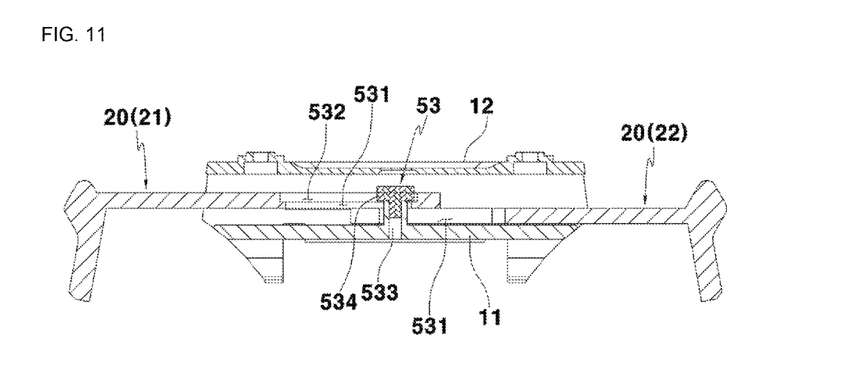
FIG. 11 shows a cross-sectional view of illustrating a connected state of a first operation guide and a second operation guide.

The wireless charging section 80 according to one embodiment of the present disclosure may charge the electronic device by magnetic induction. Thus, the wireless charging section 80 may include a charging controller 81 stacked on the second main body 12, a charging coil 82 generating an electric field based on external power under control of the charging controller 81, and the power connector 83 connected to the charging controller 81 for connection with the external power. The wireless charging section 80 includes a holding magnet 84 provided between the charging coil 82 and the charging controller 81, amplifying generation of an electromagnetic field, and supporting the mounted electronic device by magnetic force. The power connector 83 is conveniently connected to the external power since it is exposed to the outside through the exposure hole 132.

The one-touch type supporting holder according to one embodiment of the present disclosure may further include the ventilation section 90 coupled to the holder body 10 in order to cool the electronic device to be clamped by the clamping section 20, thereby inhaling air around the electronic device or exhaling air to the electronic device.

The ventilation section 90 may include an extended body 91 coupled to the first main body 11 of the holder body 10; a fan 92 mounted to the extended body 91 and operates by external power to inhale air around the electronic device or exhale air to the electronic device; and a coupling body 93 surrounds the fan 92 and coupled to the extended body 91. In this case, a ventilation slit 94 may be formed penetrating the extended body 91 and the coupling body 93 so that air can pass there through. Further, at least one of the extended body 91 and the coupling body 93 may include a ventilation supporter 95 connecting with the ventilation guide 134. Thus, air is guided along the ventilation supporter 95 and the ventilation guide 134 and cools not only the wireless charging section 80 but also the electronic device.

The extended body 91 may include a first body 911 coupled to the back of the first main body 11, and a second body 912 extended in a direction intersecting the reciprocating direction of the clamping section 20 in the first body 911. In this case, the first body 911 may be provided with a ball mounting bracket SP1. When the ball mounting bracket SP1 is provided in the first main body 11, the first body 911 may be formed with a coupling hole 913 through which the ball mounting bracket SP1 passes.

The one-touch type supporting holder according to one embodiment of the present disclosure may further include a main-body supporting section SP for detachably mounting the holder body 10 to a base B. The main-body supporting section SP may be configured to include the ball mounting bracket SP1 provided in the first main body 11 of the holder body 10 or the extended body 91 and formed with a detachable slit SP2 to be elastically transformable; a fastening bracket SP3 fastened to the base B in various publicly known forms; a coupling ball SP5 provided in the fastening bracket SP3 and fitted to the ball mounting bracket SP1, a detachable cap SP6 fastening the coupling ball SP5 to the ball mounting bracket SP1, and an extension rod SP4 connecting the fastening bracket SP3 and the coupling ball SP5.

The one-touch type supporting holder according to one embodiment of the present disclosure operates as follows.

According to one embodiment of the present disclosure, the first main body 11 and the clamping section 20 are coupled to each other through the first reciprocation section 51, the second reciprocation section 52, the clamping elastic section 30, the one-touch guide section 60 and the reciprocation restriction section 53, and allow the clamping section 20 to freely reciprocate in the first main body 11.

Further, according to one embodiment of the present disclosure, the locking supporting structure between the one-touch locking portion 122 and the first main body 11, the coupling structure of the one-touch elastic section 40, and the one-touch support section 70 make the second main body 12 be coupled to the first main body 11 and allows the second main body 12 to freely reciprocate in the forward and backward directions in the first main body 11.

Figure 12:
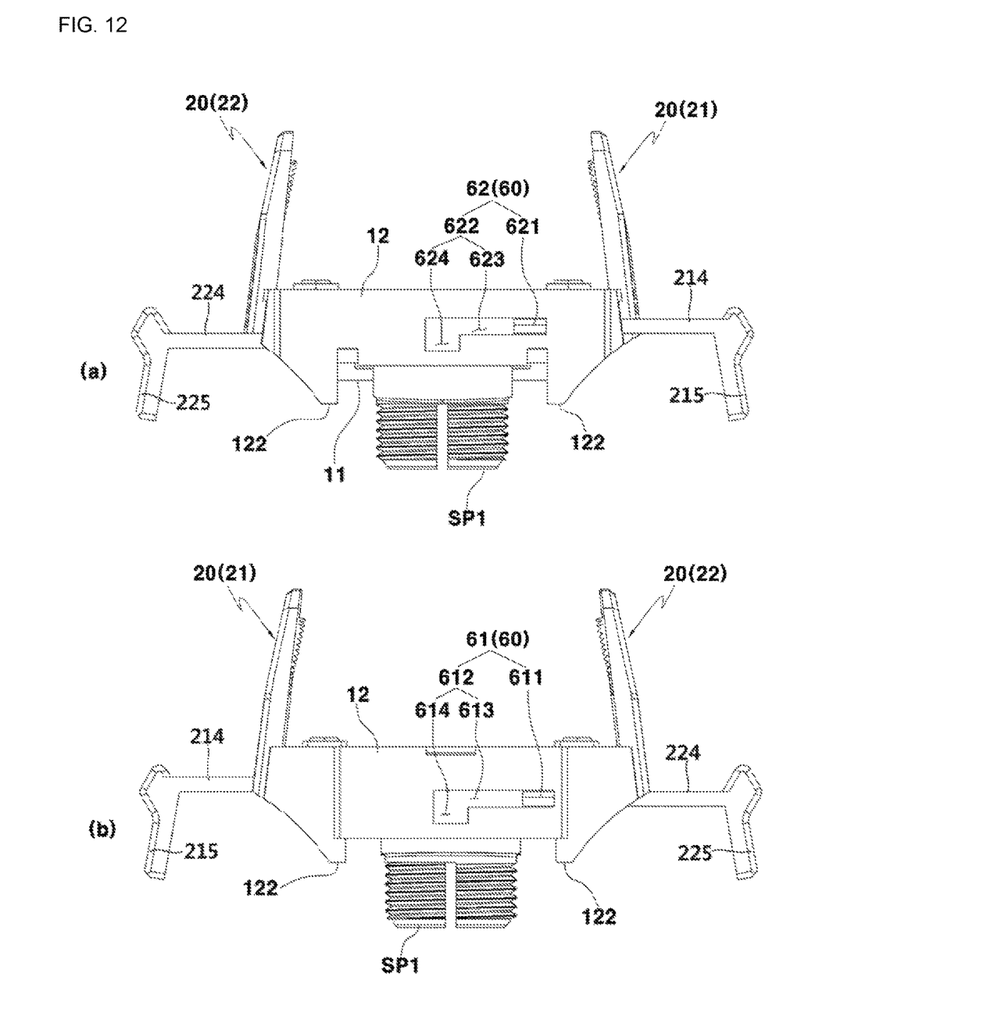
FIG. 12 shows a plan view and a bottom view of illustrating an arranged state of a first guide section and a second guide section of a one-touch guide section at an initial state where a first clamp wing and a second clamp wing are close to each other in a one-touch type supporting holder according to one embodiment of the present disclosure.

As shown in FIG. 12, the first clamping section 21 and the second clamping section 22 are in a closed state and the first operation guide 214 and the second operation guide 224 stick out from the opposite sides of the holder body 10 in an initial stage where no external forces are applied to the clamping section 20.

In this case, the first guide protrusion 611 is inserted in and supported by one side of the first reciprocation groove 613. Here, the other side of the first reciprocation groove 613 communicates with the first locking groove 614. Further, the second guide protrusion 621 is inserted in and supported by one side of the second reciprocation groove 623. Here, the other side of the second reciprocation groove 623 communicates with the second locking groove 624.

When a user applies the external force to the first knob 215 and the second knob 225 and pushes the first knob 215 and the second knob 225 toward the holder body 10, the first operation guide 214 and the second operation guide 224 are retracted into the holder body 10; the first clamp wing 212 and the second clamp wing 222 are spaced apart from the holder body 10; and the first guide protrusion 611 and the second guide protrusion 621 are moved along the first reciprocation groove 613 and the second reciprocation groove 623. Here, the first clamping section 21 and the second clamping section 22 may individually reciprocate without interlocking with each other.

Here, when a user releases the external force from the first knob 215 and the second knob 225 before the first guide protrusion 611 and the second guide protrusion 621 respectively reach the second end of the first reciprocation groove 613 and the second end of the second reciprocation groove 623, the first clamping section 21 and the second clamping section 22 are returned to the initial stage by the elasticity of the clamping elastic section 30.

Subsequently, when a user applies the external force to the first knob 215 and the second knob 225 and pushes the first knob 215 and the second knob 225 toward the holder body 10, the first guide protrusion 611 and the second guide protrusion 621 respectively reach the second end of the first reciprocation groove 613 and the second end of the second reciprocation groove 623. In this case, the restriction protrusion 533 moves from one end portion to the other end portion of the restriction groove 531 in the reciprocation restriction section 53, thereby restricting the reciprocating movement of the first clamping section 21 and the second clamping section 22.

Figure 13:
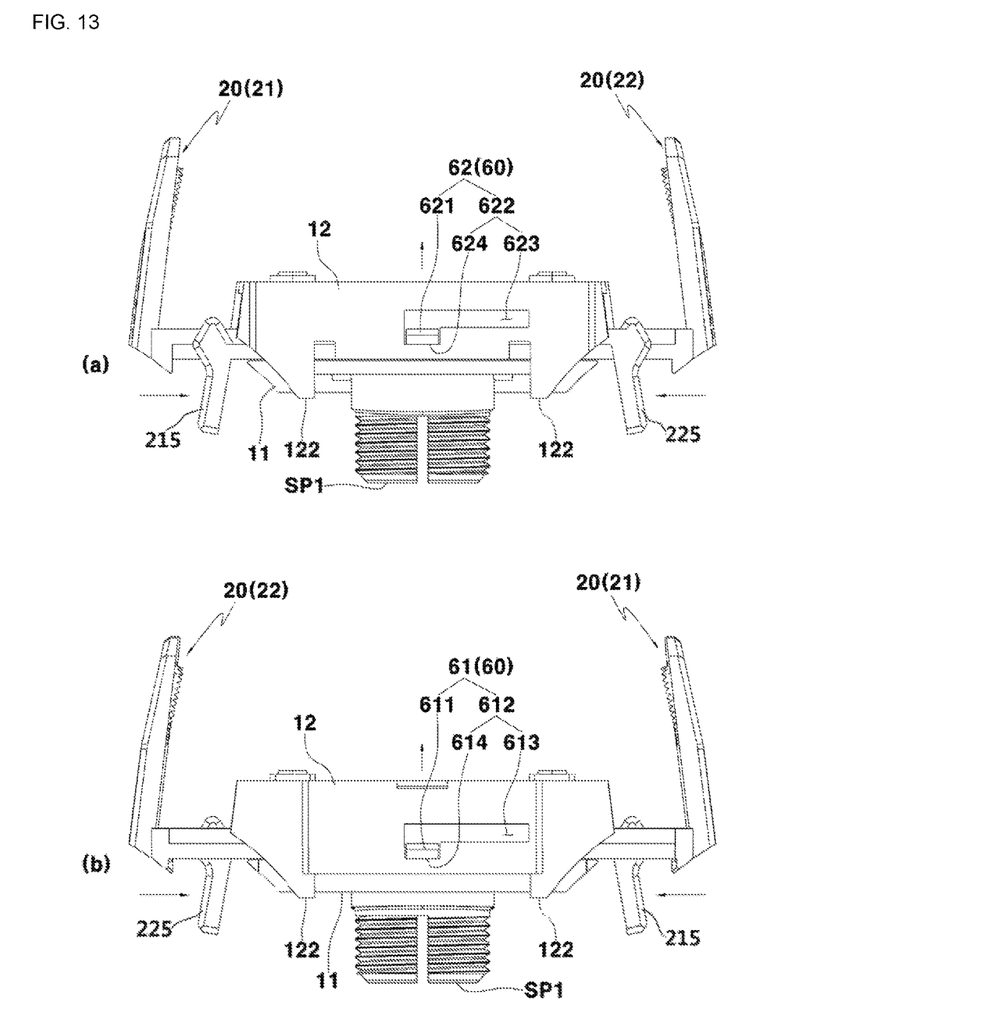
FIG. 13 shows a plan view and a bottom view of illustrating an arranged state of the first guide section and the second guide section of the one-touch guide section when the first clamp wing and the second clamp wing are away from each other as far as possible to clamp the electronic device.

Here, the elasticity of the one-touch elastic section 40 is being applied to the second main body 12, and therefore, as shown in FIG. 13, the first guide protrusion 611 and the second guide protrusion 621 are respectively inserted in the first locking groove 614 and the second locking groove 624. At the same time, the second main body 12 moves forward to the front of the first main body 11 and the first clamping section 21 and the second clamping section 22 are in an opened state.

Further, when a user releases the external force applied to the first knob 215 and the second knob 225, the first clamping section 21 and the second clamping section 22 are made to return to their original positions by the elasticity of the clamping elastic section 30. However, the first guide protrusion 611 and the second guide protrusion 621 are respectively locked to and supported by the first locking groove 614 and the second locking groove 624, and thus the second main body 12 is maintained as moved forward to the front of the first main body 11, and the first clamping section 21 and the second clamping section 22 are maintained in the opened state.

When a user mounts the electronic device onto the front of the holder body 10 and presses the electronic device in the backward direction of the holder body 10, the first guide protrusion 611 and the second guide protrusion 621 are respectively separated from the first locking groove 614 and the second locking groove 624, and the elasticity of the clamping elastic section 30 makes the first guide protrusion 611 and the second guide protrusion 621 respectively return to the first end of the first reciprocation groove 613 and the first end of the second reciprocation groove 623, and makes the first clamping section 21 and the second clamping section 22 return to their initial positions. In this case, the first clamp wing 212 and the second clamp wing 222 are configured to clamp both lateral sides of the electronic device, and therefore the elasticity of the clamping elastic section 30 makes the first clamping section 21 and the second clamping section 22 clamp the electronic device.

Further, a user may pull out the clamped electronic device to separate the electronic device from the one-touch type supporting holder. In this case, the first clamping section 21 and the second clamping section 22 return to the initial state by the elasticity of the clamping elastic section 30.

According to the present disclosure, a one-touch type supporting holder not only achieves a preparatory state for gripping an electronic device but is also convenient for mounting the electronic device to the supporting holder by one touch. Further, it is also possible to make the one-touch type supporting holder compact and slim.

Although a few exemplary embodiments of the present disclosure have been described with reference to the accompanying drawings, it will be appreciated by those skilled in the art that various changes or modifications may be made in these embodiments without departing from the principles and spirit of the invention, the scope of which is defined in the appended claims and their equivalents.

REFERENCE NUMERALS

10: holder body
11: first main body
12: second main body
121: one-touch wing
122: one-touch locking portion
13: third main body
131: cover
132: exposure hole
133: support pad
134: ventilation guide
135: connection hole
20: clamping section
21: first clamping section
211: first clamp slider
211a: support guide
212: first clamp wing
213: first support cushion
214: first operation guide
215: first knob
22: second clamping section
221: second clamp slider
222: second clamp wing
223: second support cushion
224: second operation guide
225: second knob
30: clamping elastic section
31: first guide groove
32: second guide groove
33: first support protrusion 34: second support protrusion
35: clamping elastic member
40: one-touch elastic section
41: one-touch mounting groove
42: one-touch projection
43: one-touch elastic member
51: first reciprocation section
511: first reciprocation guide
512: first reciprocation-path portion
52: second reciprocation section
521: second reciprocation guide
522: second reciprocation-path portion
53: reciprocation restriction section
531: restriction groove
532: restriction guide groove
533: restriction protrusion
534: restriction guide protrusion
535: interference preventing hole
60: one-touch guide section
61: first guide section
611: first guide protrusion
612: first guide groove
613: first reciprocation groove
614: first locking groove
62: second guide section
621: second guide protrusion
622: second guide groove
623: second reciprocation groove
624: second locking groove
70: one-touch support section
71: one-touch support protrusion
72: locking hook
73: one-touch support hole
80: wireless charging section
81: charging controller
82: charging coil
83: power connector
84: holding magnet
90: ventilation section
91: extended body
911: first body
912: second body
913: coupling hole
92: fan
93: coupling body
94: ventilation slit
95: ventilation supporter

What is claimed is:

1. A one-touch type supporting holder comprising:
a holder body which comprises a first main body supported on a base, and a second main body stacked and coupled to the first main body and capable of reciprocating in forward and backward directions;
a clamping section which comprises a first clamping section coupled to the first main body and capable of reciprocating in left and right directions or up and down directions, and a second clamping section coupled to the first clamping section and capable of reciprocating in left and right directions or up and down directions so as to reciprocate in parallel with the first clamping section;
a clamping elastic section which elastically supports the second clamping section with respect to the first clamping section;
an one-touch elastic section which elastically supports the second main body with respect to the first main body; and
an one-touch guide section which comprises a first guide section to control forward and backward reciprocating movement states of the second main body in the first main body corresponding to reciprocating movement of the first clamping section, and a second guide section to control forward and backward reciprocating movement states of the second main body in the first main body corresponding to reciprocating movement of the second clamping section.

2. The one-touch type supporting holder according to claim 1, wherein the first clamping section comprises:
a first clamp slider coupled to the first main body by a first reciprocation section and capable of reciprocating;
a first clamp wing protruding from the first clamp slider at one side intersecting the reciprocating direction frontward at one side of the second main body; and
a first operation guide provided at one side of the first clamp slider in parallel with the reciprocating direction and protruding toward the other side of the second main body.

3. The one-touch type supporting holder according to claim 1, wherein the second clamping section comprises:
a second clamp slider coupled to the first clamping section by a second reciprocation section and capable of reciprocating;
a second clamp wing protruding from the second clamp slider at one side intersecting the reciprocating direction frontward at the other side of the second main body; and
a second operation guide provided at one side of the second clamp slider in parallel with the reciprocating direction and protruding toward one side of the second main body.

4. The one-touch type supporting holder according to claim 1, wherein the clamping elastic section comprises:
a guide groove lengthwise recessed or formed by penetration in parallel with a reciprocating direction of the clamping section, in at least one of the first clamping section and the second clamping section with respect to a surface where the first clamping section and the second clamping section face with each other;
a first support protrusion protruding from the first clamping section in relation to the guide groove; a second support protrusion protruding from the second clamping section in relation to the guide groove; and
a clamping elastic member having a first end supported by the first support protrusion and a second end supported by the second support protrusion as inserted in the guide groove.

5. The one-touch type supporting holder according to claim 1, wherein the one-touch elastic section comprises:
a one-touch mounting groove protruding from one of the first main body and the second main body, a one-touch projection protruding from the other one of the first main body and the second main body and being opposite to the one-touch mounting groove, and
a one-touch elastic member having a first end supported by the one-touch mounting groove and a second end supported by the one-touch projection and elastically supporting the second main body against the first main body.

6. The one-touch type supporting holder according to claim 1, wherein the second main body comprises an one-touch wing formed at an edge thereof in parallel with the reciprocating direction of the clamping section and protruding toward the first main body, the first guide section comprises a first guide protrusion protruding from the first clamping section toward the one-touch wing; and a first guide groove provided in the one-touch wing, forming the reciprocating path of the first guide protrusion corresponding to the reciprocating movement of the first clamping section as the first guide protrusion is inserted therein, and forming the reciprocating path of the first guide protrusion corresponding to the reciprocating movement of the second main body, and the second guide section comprises a second guide protrusion protruding from the second clamping section toward the one-touch wing, and a second guide groove provided in the one-touch wing, forming the reciprocating path of the second guide protrusion corresponding to the reciprocating movement of the second clamping section as the second guide protrusion is inserted therein, and forming the reciprocating path of the second guide protrusion corresponding to the reciprocating movement of the second main body.

\* \* \* \* \*